INVENTOR
MARC BRUMA &
MICHEL MAGAT
BY
Bailey, Stephens + Huettig
ATTORNEYS

2,969,482

MACHINING SYSTEMS MAKING USE OF INTERMITTENT ELECTRICAL DISCHARGES

Marc Bruma, Pavillons-sous-Bois, and Michel Magat, Bourg-la-Reine, France, assignors to Centre National de la Recherche Scientifique, Paris, France, a corporation of France Filed Sept. 30, 1957, Ser. No. 687,105

Claims priority, application France Oct. 8, 1956

8 Claims. (Cl. 315—207)

The present invention relates to intermittent electrical discharge machining systems, that is to say systems making use of the electrical erosion effect for machining pieces made of conductor metals and alloys, however hard they may be, by producing intermittent electrical discharges between the piece to be machined forming one electrode and another electrode acting as machining tool and made of a condutcor metal or alloy the hardness of which may be much lower than that of the piece, said discharges being generated by an electrical source the terminals of which are connected with said two electrodes respectively.

The object of our invention is to provide a system of this kind which is better adapted to meet the requirements of practice than those existing at the present time, especially with a view to reducing the wear of the tool electrode.

For this purpose, according to our invention, we provide such a system with means responsive to the electrical machining discharges for producing during the end of each of them, a temporary reduction of the amplitude of the instantaneous electric field existing between the electrodes.

Preferred embodiments of our invention will be hereinafter described with reference to the appended drawings given merely by way of example and in which.

Figure 1:
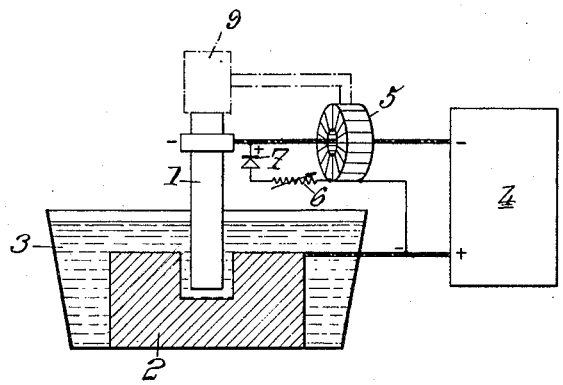
Fig. 1 is a diagrammatical view of an embodiment of the system according to our invention.

This system, as illustrated by Fig. 1, includes a tool 1 and a piece 2 to be machined, the adjacent ends of said elements forming electrodes immersed in a fluid 3 and respectively connected with the terminals of a spark generating source 4 of a known type. Every time a spark is produced between said electrodes, matter is torn away from each of them and it is possible, by suitably adjusting the distance between tool 1 and piece 2, as matter is thus detached from them, to give the piece a shape corresponding to that of the tool. Accuracy of the shaping of the piece decreases as the tool is being worn.

This wear of the tool, which generally averages and even may exceed 40% in volume of that the piece to be machined, is a serious drawback of the electrical machining process because it makes it necessary often to replace the tool that has become worn by a new one. Furthermore, the accuracy of machining is more or less reduced and the cost of the operation is increased.

The manner in which the tool becomes worn may be explained as follows:

If, as it will be hereinafter supposed, tool 1 is connected with the negative terminal of the spark source 4 and therefore constitutes a cathode with respect to piece 2, which then acts as an anode, the operation of the system may be considered as taking place as follows:

Under the effect of the high electric field produced by the source and localised in the space existing between the tool and the piece, the cathode (tool) emits electrons, which, accelerated by said electrical field, ionize the molecules of fluid that they strike, thus releasing other electrons, which in turn are accelerated by the electric field.

This produces a chain reaction the products of which are, on the one hand, positive ions and, on the other hand, electrons which, accelerated by the electric field, form a stream which impinges on the anode (piece 2).

Their impact results in a complex shock-wave (thermal, electromagnetic, sonic and ultrasonic wave) which produces the anodic "crater." As a consequence of this, positively electrified metallic ions detached from the piece and mixed with ionized particles of the fluid have a tendency to rush onto the cathode under the effect of the electric field and to cause a gradual destruction of said cathode (tool) thus bombarded by said ions.

Therefore, every time a discharge takes place, the erosion action in the cathode crater precedes that taking place in the anode crater.

The object of our invention is to reduce the effect of this return bombardment, thus reducing the wear of the tool, without lowering the rate of machining of the piece, since as above stated the erosion action of the anode crater is finished when we intend to act upon the formation of the cathode crater.

For this purpose, according to our invention, we provide means responsive to the machining discharges for producing, during the end of each of them, a temporary reduction of the amplitude of the instantaneous electric field existing between the electrodes (this reduction possibly reducing said amplitude to zero or even reversing the direction of the field).

The positive ions formed by the particles detached from the anode crater will no longer be attracted toward the cathode, or, at least, the attraction will be smaller so that the external shape of the tool will be maintained for a longer time.

This reduction of the electric field must take place at the same relative time during every machining discharge and it should cease at the latest shortly after the end of this discharge.

It is therefore especially advantageous to obtain this reduction of the electric field by means of a voltage impulse controlled by the instantaneous discharge current but taking place with a suitable lagging phase difference with respect to said discharge, said voltage impulse being of a sign opposed to that of the voltage impulse which produces the discharge. It is of shorter duration than said last mentioned impulse and its amplitude is of the same order of magnitude.

Advantageously, according to our invention, we provide, around one of the conductors through which current is fed from the spark source to produce the discharge, a winding 5 belonging to an electric circuit mounted in shunt across the terminals of said source, said shunt circuit comprising a resistor 6 and a rect.fier element 7 such that the voltage impulse created by w.nding 5 can flow only in the desired direction.

Figure 5:
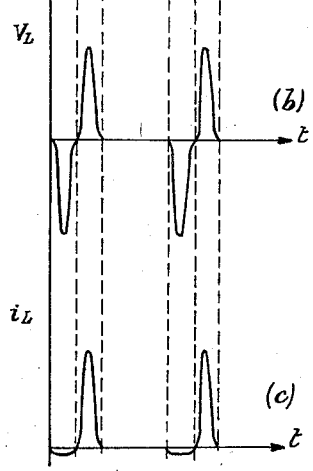
Fig. 5 shows curves illustrating the operation of the system according to our invention.

The instantaneous discharge current I, the form of which is shown by Fig. 5(a) induces in winding 5 a voltage impulse $V_L$ (shown on Fig. 5(b)) proportional to the derivative $$\frac{dI}{dt}$$

of said current I with respect to time $t$.

This voltage $V_L$ has two amplitude maximums of opposed polarities which occur respectively a short time after the beginning and a short time before the end of the discharge current impulse.

The electrical connections and the direction of rectifier 7 are such that the current impulse $i_L$ (shown on Fig. 5(c)) which corresponds to voltage $V_L$ places a positive bias on cathode 1 during the end of the machining discharge period.

The duration of this "opposed" impulse is shorter than that of the machining impulse since rectifier 7 eliminates a portion of the impulse that would otherwise be induced in winding 5.

The phase difference between the beginning of the machining impulse and that of the opposed impulse is for instance equal to about one half of the total duration of the machining impulse, that is to say 10 microseconds if the duration of said impulse is 20 microseconds. This duration can be adjusted by giving resistor 6 the form of a potentiometer and by suitably adjusting the resistance R thereof which, together with the self inductance L of winding 5, determines the time constant of the circuit.

Winding 5 may advantageously include a ring of ferrite or other magnetic material which avoids any undue heating during the impulses, said ring forming the core of a coil constituted for instance by some hundred spires of fine and insulated wire wound around this ring.

For instance, the external diameter of said ring is 5 centimeters, the inner diameter 3 centimeters and its length 1 centimeter, so that its useful cross section is 1 square centimeter.

Rectifier 7, which is to control the high frequency current impulses, is for instance of the semi-conductor type (germanium, silicon and so on).

Figure 2:
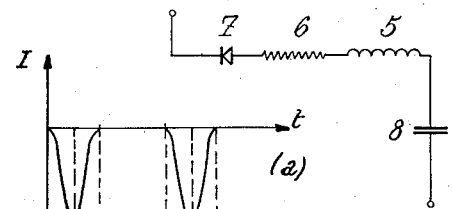
Figs. 2, 3 and 4 are part views showing elements of other embodiments corresponding to modifications of that of Fig. 1.

We may ensure decoupling of the circuit including winding 5 with respect to any direct component from generator 4 by means of a capacitor 8, possible adjustable, inserted in said circuit (Fig. 2).

Figure 3:
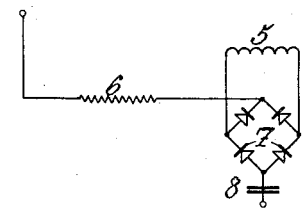
Figure 4:
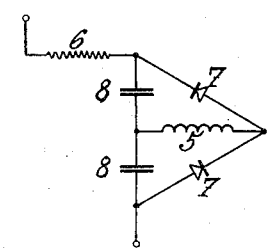

Figs. 3 and 4 show modifications of the lay-out of Fig. 1, including the same essential elements, to wit winding 5, resistor 6, rectifier means 7 (four of these rectifiers being used in the case of Fig. 3 and two of them in the case of Fig. 4) and, possibly, one or several capacitors 8.

We may also, within the scope of our invention, amplify—for instance by means of electronic devices of a known kind—the above mentioned opposed impulse before applying it between the tool and the piece.

The same result as that obtained by the above described system may also be achieved by providing means such that tool 1 and the piece 2 to be machined are moved away from each other during the end of the machining discharge. The positive metallic ions which have been detached during the beginning of the discharge must then travel over a long path to reach the cathode and, during this travel, they may lose at least a portion of their charge by collecting electrons, striking particles of the fluid interposed between the electrodes so that their velocity is reduced, etc.

Therefore, the intensity of the ionic bombardment undergone by the tool acting as a cathode would be reduced as desired.

As the distance between the electrodes must be brought back to its low initial value at the beginning of the next machining discharge, the relative position of the electrodes is advantageously controlled by a vibrator 9 energized at the frequency of the machining discharge and the vibrations of which are for instance transmitted to the cathode.

Such an operation of the vibrator may be ensured by the impulses which produce the machining discharges, for instance after passage thereof through a delay system where they are made to lag with respect to said discharge producing impulses, this lag being determined in particular as a function of the inertia of the vibrator and of the time during the discharge period where the electrodes are to be moved away from each other.

Of course, if the system includes a winding 5 arranged as above described, the vibrator 9 is controlled from said winding as shown in dotted lines on Fig. 1.

Vibrator 9 may be of any suitable type (electromagnetic, piezoelectric, magnetostriction or similar vibrator) capable of working at a high frequency such as 50,000 per second while it is subjected to the action of said opposed impulses.

What we claim is:

1. An electrical discharge machining system which comprises, in combination, a tool forming an electrode, mounted opposite a piece to be machined acting as another electrode, an electrical source for generating successive discharges between said electrodes, means connecting the terminals of said source with said two electrodes respectively, and means separate from the connecting means responsive to said discharges for applying to the tool electrode, in lagging phase relation to the beginning of each of said discharges, a voltage impulse of a sign opposed to that of the impulse which has produced said discharge and of a duration shorter than said second mentioned impulse so that said first mentioned impulse ends before the next impulse of the second mentioned kind begins.

2. A system according to claim 1 in which the amplitude of said first mentioned impulse is substantially equal to that of said second mentioned impulse.

3. An electrical discharge machining system which comprises, in combination, a tool forming an electrode, mounted opposite a piece to be machined acting as another electrode, an electrical source for generating successive discharges between said electrodes, a conductor extending between one terminal of said source and one of said electrodes, another conductor extending between the other terminal of said source and the other of said electrodes, an electric circuit mounted in shunt relation to the circuit constituted by said source and said two conductors, and a winding inserted in said shunt circuit and located close to one of said conductors so that every discharge impulse in said last mentioned conductor induces in said shunt circuit an impulse of opposed direction.

4. An electrical discharge machining system which comprises, in combination, a tool forming an electrode, mounted opposite a piece to be machined acting as another electrode, an electrical source for generating successive discharges between said electrodes, a conductor extending between one terminal of said source and one of said electrodes, another conductor extending between the other terminal of said source and the other of said electrodes, an electric circuit mounted in shunt relation to the circuit constituted by said source and said two conductors, a winding inserted in said shunt circuit and located close to one of said conductors so that every discharge impulse in said last mentioned conductor induces in said shunt circuit an impulse of opposed direction, and a rectifier in said shunt circuit to permit the passage therethrough of current flowing in a direction opposed to that flowing through said conductors.

5. A system according to claim 3 in which said shunt circuit is branched between said conductors.

6. A system according to claim 4 in which said shunt circuit is branched between said conductors.

7. A system according to claim 3 including a ferrite ring coaxially surrounding one of said conductors, said winding consisting of a wire wound around said ring to form spires located substantially in planes passing through the axis of said ring.

8. A system according to claim 4 including a ferrite ring coaxially surrounding one of said conductors, said winding consisting of a wire wound around said ring to form spires located substantially in planes passing through the axis of said ring.

(References on following page)

References Cited in the file of this patent

UNITED STATES PATENTS

| | | |
|---|---|---|
| 2,796,509 | Blake | June 18, 1957 |
| 2,804,575 | Matulaitis | Aug. 27, 1957 |
| 2,807,706 | Oezer | Sept. 24, 1957 |
| 2,818,490 | Dixon et al. | Dec. 31, 1957 |
| 2,827,595 | Bruma et al. | Mar. 18, 1958 |
| 2,856,565 | Matulaitis | Oct. 14, 1958 |

FOREIGN PATENTS

| | | |
|---|---|---|
| 748,543 | Great Britain | Dec. 21, 1951 |
| 1,108,112 | France | Dec. 3, 1953 |

OTHER REFERENCES

"Working Metals by Electro-Sparking," Russian translation by Her Majesty's Stationery Office, London, England, 1956, page 48.